(12) United States Patent
Parla et al.

(10) Patent No.: US 12,375,448 B2
(45) Date of Patent: Jul. 29, 2025

(54) AUTOTUNING OPTIMAL KEEPALIVE INTERVALS FOR SECURE SESSIONS

(71) Applicant: Cisco Technology, Inc., San Jose, CA (US)

(72) Inventors: Vincent E. Parla, North Hampton, NH (US); Oleg Bessonov, Littleton, MA (US); Andrew Zawadowskiy, Hollis, NH (US)

(73) Assignee: Cisco Technology, Inc., San Jose, CA (US)

( * ) Notice: Subject to any disclaimer, the term of this patent is extended or adjusted under 35 U.S.C. 154(b) by 228 days.

(21) Appl. No.: 18/115,374

(22) Filed: Feb. 28, 2023

(65) Prior Publication Data

US 2024/0291800 A1     Aug. 29, 2024

(51) Int. Cl.
*H04L 9/40*       (2022.01)

(52) U.S. Cl.
CPC ...... *H04L 63/0254* (2013.01); *H04L 63/0272* (2013.01)

(58) Field of Classification Search
CPC . H04L 63/0254; H04L 63/0272; H04L 43/10; H04L 63/166; H04L 69/28; H04L 67/145
See application file for complete search history.

(56) References Cited

U.S. PATENT DOCUMENTS

| | | | | |
|---|---|---|---|---|
| 6,304,546 B1 * | 10/2001 | Natarajan | ................. | H04L 9/40 370/231 |
| 7,561,593 B1 * | 7/2009 | Wilkie | ................ | H04L 43/0817 370/450 |
| 7,768,939 B1 * | 8/2010 | Trivedi | ................... | H04L 43/10 709/224 |
| 8,156,209 B1 * | 4/2012 | Phadnis | ................ | H04L 67/145 709/227 |
| 8,959,235 B1 * | 2/2015 | Newstadt | ................ | H04L 69/28 709/227 |
| 9,043,472 B1 * | 5/2015 | Chau | ....................... | H04L 43/10 709/227 |
| 9,883,548 B2 * | 1/2018 | Backholm | ............. | H04W 24/08 |

(Continued)

OTHER PUBLICATIONS

Search Report and Written Opinion for International Application No. PCT/US2024/017396, Dated Jun. 7, 2024, 12 pages.

*Primary Examiner* — J. Brant Murphy
(74) *Attorney, Agent, or Firm* — Lee & Hayes, P.C.

(57) ABSTRACT

Techniques for auto tuning keepalive packets intervals to an optimal interval are described. A remote secure session between a client device and a server over a network is established. A determination is made to identify an optimal keepalive interval for sending packets to keep the remote secure session alive over the network, the optimal keepalive interval defining an amount of time between sending of packets that keep a connection open through middleboxes in the network. Keepalive test probes are transmitted by the client device and to the server at different time intervals. An optimal keepalive interval is determined based at least in part on the keepalive test probes transmitted at the different intervals. The client device transmits information indicating the optimal keepalive interval to the server. Finally, the client device transmits keepalive packets according to the optimal keepalive interval.

20 Claims, 5 Drawing Sheets

(56) References Cited

U.S. PATENT DOCUMENTS

| | | | |
|---|---|---|---|
| 2008/0307100 A1* | 12/2008 | Duggirala | H04L 67/02 709/228 |
| 2010/0278101 A1* | 11/2010 | Bengtsson | H04L 61/2553 370/328 |
| 2010/0325306 A1* | 12/2010 | Vimpari | H04L 69/28 709/233 |
| 2011/0225230 A1* | 9/2011 | Russ | H04L 69/163 709/224 |
| 2013/0151719 A1* | 6/2013 | Herzog | H04L 69/28 709/227 |
| 2013/0246641 A1* | 9/2013 | Vimpari | H04L 67/142 709/228 |
| 2014/0115150 A1* | 4/2014 | Ewanchuk | H04L 67/145 709/224 |
| 2017/0019946 A1* | 1/2017 | Backholm | H04L 67/14 |
| 2019/0098687 A1* | 3/2019 | Backholm | H04L 43/10 |
| 2020/0322259 A1* | 10/2020 | Sung | H04L 45/245 |
| 2024/0291800 A1* | 8/2024 | Parla | H04L 43/10 |

\* cited by examiner

AUTOTUNING OPTIMAL KEEPALIVE INTERVALS FOR SECURE SESSIONS

TECHNICAL FIELD

The present disclosure relates generally to autotuning keepalive packets. Specifically, a client endpoint device may determine the optimal keepalive interval needed to keep connections alive based on network conditions.

BACKGROUND

When a session between a client endpoint and a server over a network is established, the connection is valid until one side closes it. However, when a session is established over a network, the connection will not last indefinitely as some middleboxes in a network, such as network address translation (NAT) systems or a firewall will close a connection if there has not been any activity for a predetermined amount of time. A keepalive packet may be used to keep a session open through these intermediary devices in a network even when data inactivity occurs.

Keepalives for various secure communication protocols have been available for some time. The primary purpose of keepalives is to keep a communication session active through intermediary devices, or middleboxes, such as NAT systems or firewalls. Current implementations of keepalives are typically a fixed configuration that is conveyed by the server to the client as a parameter or just a client configuration. The setting for keepalive intervals has no roaming properties and does not change regardless of network conditions. The server is the one selecting the keepalive parameters for a session or more often user provided configuration. As such, the configuration is typically a fixed value. For user datagram protocol (UDP) and Internet protocol (IP) protocols it is typically configured to be 30 seconds as most intermediary devices like a NAT will typically consider idle close UDP flow after 40 seconds. Thus, when no data is sent between a client device and a server for 30 seconds, the client device will send a keepalive packet to ensure the remote secure session is not closed by an intermediary device in the network. For transmission control protocol (TCP) sessions it is typically on the order of many minutes, but the same issues exist for those types of sessions as well. For example, even if there is no intermediary device in the network that would close the remote secure session because of inactivity, every 30 seconds the client device will still send a keepalive packet during times of prolonged data inactivity. These packets must then be unnecessarily decrypted and analyzed by the head end.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes a method for determining an optimal keepalive interval for a network. A first method includes establishing a remote secure session between a client device and a server over a network. Further, the method may include determining to identify an optimal keepalive interval for sending packets to keep the remote secure session alive over the network, the optimal keepalive interval defining an amount of time between sending of packets that keep a connection open through middleboxes in the network. The method may also include transmitting, by the client device and to the server, keepalive test probes at different time intervals. Additionally, the method may include determining, by the client device, whether packets are received from the server. The method may also include, determining the optimal keepalive interval based at least in part on the keepalive test probes transmitted and the keepalive responses received. Also, the method may include transmitting, by the client device and to the server, information indicating the optimal keepalive interval. Finally, the method may include transmitting keepalive packets, by either the client device or the server, according to the optimal keepalive interval.

EXAMPLE EMBODIMENTS

As described above, currently, keepalives for various secure communication protocols are used to keep a communication session active through middleboxes (e.g., a firewall or a home router) in a network. Typically, keepalives have a fixed configuration that is conveyed by the server to a client or endpoint device as a parameter. Because the server is the one selecting the keepalive parameters for the session, it has no awareness of the network path the client device took to reach the server, and therefore cannot adapt the parameters to configuration settings. As such the configuration is typically a fixed value, set at an interval that is sure to keep the session open even when a much longer interval would suffice. Thus, even if there is no middlebox in the network that would terminate a session because of inactivity, every 30 seconds (or whatever the default keepalive interval is) the client device will send a keepalive packet during times of prolonged data inactivity. These packets must then be unnecessarily decrypted and analyzed by the head end creating inefficiencies that are otherwise not necessary.

Alternately, in some examples, a keepalive interval may be set such that keepalive packets will not be sent often enough and during times of prolonged data inactivity, the intermediary device will reset the connection. In this example, the loss of a connection may be excessively expensive and depending on the criticality of the connection, may be catastrophic. In the even there is a connection with little data traffic, a client may be stuck in a state of perpetually reestablishing a connection because the keepalive interval is set such that packets are not sent often enough to actually keep the connection alive.

This disclosure describes techniques for determining an optimal keepalive interval needed to keep a connection alive based on network conditions. Each time a client device encounters a network interface change (e.g., new SSID, new IP assignment, etc.) or when a session has roamed to another interface (e.g., roaming from one Wi-Fi network to another, or roaming from a Wi-Fi network to a cellular), the client endpoint device can determine the optimal keepalive interval and communicate that interval to the server so that either node is able to send keepalives as required at the longest interval that is appropriate.

To determine the optimal keepalive interval, a remote secure session is established between a client device and a server over a particular network. The remote secure session may be any type of secure connection, for example an Internet Protocol Security (IPsec) Virtual Private Network (VPN) connection, a Datagram Transport Layer Security (DTLS) VPN connection, a QUIC connection, or any other type of appropriate remote secure connection. Once the remote secure connection is established, a determination is made by the client device to identify an optimal keepalive interval for the network that the client device has joined. The optimal keepalive interval is an amount of time between sending of packets that keep the secure connection open through middleboxes in the network that the client has joined. The client device will send a series of keepalive test probes at different time intervals and wait to see if any packets are received from the server. The optimal keepalive interval may be determined based on the keepalive test probes sent and the responses received. Alternately or in addition, other types of probing may be used to determine an interval approaching the maximum interval between packets in which intermediary device in a network will not terminate a connection, for example, Dead Peer Detection (DPD) probes.

Once the optimal keepalive interval is determined by the client device, the client device may transmit the optimal keepalive interval information to the server. In addition, the client device may send keepalive packet to the server according to the optimal keepalive interval determined. When no peer traffic is detected by the client, and an interval of time reaches the optimal keepalive time, the client device will send a keepalive packet to the server to ensure the connection is not terminated by an intermediary device in the network. For example, when a QUIC connection between a client device and server experiences a prolonged time interval in which no data flow is detected between the client device and the server, the client device will send a keepalive packet (a QUIC PING packet with no payload) to the server to ensure the QUIC connection is not terminated by an intermediary device in the network once the optimal keepalive interval has elapsed.

In some examples, when an optimal keepalive interval is determined, the client device may cache the optimal keepalive interval for the server over the network such that when connecting to the server over the network in subsequent remote secure sessions, the optimal keepalive interval may be used without having to redetermine an optimal keepalive interval again, thus increasing efficiency and reducing network traffic.

If a change to the network interface is encountered (e.g., new SSID, new IP assignment, etc.), a change in a network configuration is detected, or a session roams to another interface (e.g., the client device switches Wi-Fi interfaces, or roams to a cellular interface, etc.) the client device can determine a new optimal keepalive interval for the network configuration and communicate that to the server. Alternately or in addition to determining an optimal keepalive interval when a network interface change is detected, an enterprise may require that a new optimal keepalive interval be determined after a predetermined time interval has elapsed. For instance, a network enterprise may have a policy to redetermine an optimal keepalive interval between a client and a server over a network at least once every predetermined time interval.

Additionally, in some examples when a session is deemed critical (e.g., in a hospital) and any possibility of the session being disconnected could be catastrophic, an additional second remote session may be established in parallel to the first remote session. In this example, the first remote secure connection may use a keepalive interval that is known to keep the connection open, such as a default 30 seconds, such that the critical connection between the client endpoint and the server will stay open regardless of dataflow between the client endpoint and the server. At the same time, the parallel second remote session may be used to determine an optimal keepalive interval using techniques described herein. Once the optimal keepalive interval is determined, the second secure session may be terminated and the optimal keepalive interval may then be used to keep the first remote session active. In this way, an optimal keepalive interval for the network configuration may be determined without a critical connection being inadvertently terminated.

As stated above, to determine an optimal keepalive interval, the client device will send a series of keepalive test probes at different time intervals and wait to see whether packets are received from the server, for example data traffic sent from the server or a DPD probe or response sent from the server. The optimal keepalive interval may be determined based on the keepalive test probes sent and the responses received. Various algorithms may be used to determine the various intervals between keepalive test probes sent. The algorithms may slowly tune the intervals in which keepalive test probes are sent from the client device to the server until arriving at an optimal keepalive interval. An optimal keepalive interval will be an interval that approaches the longest interval possible between packets that will keep the communication session active through middleboxes in a network yet still ensure the session will not be inadvertently disconnected.

In some examples, an algorithm that begins with a long interval intended to terminate the communication session, and continuously reestablishes a communication session, and sends keepalive test probes at increasingly smaller intervals between packets until an interval is found that will keep the communication session active for the network configuration is used. In such a solution, the client takes a best guess at the appropriate interval, targets the highest possible value it believes will result in a proper keepalive interval. If a subsequent failure is observed, the client picks a new value and continues to iterate over time. In a worst-case scenario, the client initially picks a lower value than is optimal, however as long as that value is still greater than the server advertised value (e.g., the preconfigured keepalive value such as 30 seconds), it is still an improvement over the current fixed system. However, by picking an initial value known to fail, the client is sure to arrive at an optimal keepalive interval using the algorithm to continually pick new, increasingly lower, values over time. This type of algorithm may be used in circumstances where it is advantageous to push to find the longest possible optimal keepalive time interval and where some delay when a client first joins a network, and in situation where customer interruption is not critical. Such an approach is ideal for a network system that is present for a long period of time where the client is unlikely to encounter a new network behavior thus, once an optimal keepalive interval is determined it may be used indefinitely in subsequent sessions. For example, a home network of a client is unlikely to experience a configuration change, is not particularly critical, in that some connection disruption at the beginning, is unlikely to have detrimental consequences. In addition, a home network is a network a client will join frequently, where the optimal keepalive interval will be cached such that when connecting to the server over the home network in subsequent remote secure sessions, the optimal keepalive interval may be used.

In another example, an algorithm may begin with a short time interval that is known to keep the communication session active and send keepalive test probes at increasingly larger intervals between packets until an interval is found that is optimal. In some examples this may be done by finding the first interval between packets that terminates a communication session and using the just previous interval that kept the communication session open as the optimal keepalive interval. In another example, the algorithm may go back and forth to narrow the distance between an interval known to keep the communication session open and an interval found that terminates the communication session until an optimal keepalive interval is reached. In still another example, the algorithm may reach an interval that an enterprise organization has determined is sufficiently long for a keepalive interval and use that interval as the optimal keepalive interval. This algorithm approach is ideal for situations in which it may be more important to keep a session alive, than finding the absolute longest time between packets that will keep a communication session from terminating. Thus, a sufficiently long keepalive interval may be found without the consequences of prematurely terminating a communication session.

Moreover, a number of machine learning approaches may be used to evaluate outcomes across many sessions and deduce an overall ideal keepalive value to use for a given session for a network configuration. In one example, both a client and a server, track communication sessions that are closed unexpectedly and share that context with each side so that both sides can learn about how long a session was active without sending any data. From such an approach, no additional probing is required as the client and server both learn the ideal keepalive interval over time from various sessions created between the two endpoints over a particular network. In this model, the shared learning can be exchanged whenever a new session is created as a meta-data exchange. Both the client and server can decide independently how much data to analyze before selecting a value. The server can propose a suggested keepalive interval value from its learning to the client and the client can then decide to use it or to select a different value based on its own learning. In this mode, no additional probes are used, and the evaluation is done using actual sessions between the client and server. Once a value is selected, it can be used and if the system still fails, it can once again lean and auto-tune the value to find the largest possible "guess" for the specific networking environment.

The above-described algorithms and machine learning instances are but examples of ways in which an optimal keepalive interval may be determined for a network configuration and should not be construed as limiting, as any appropriate algorithmic and/or machine learning approach may be used to determine an optimal keepalive interval that may be cached and used for subsequent remote secure sessions between a client device and a server over a particular network configuration.

Figure 1:
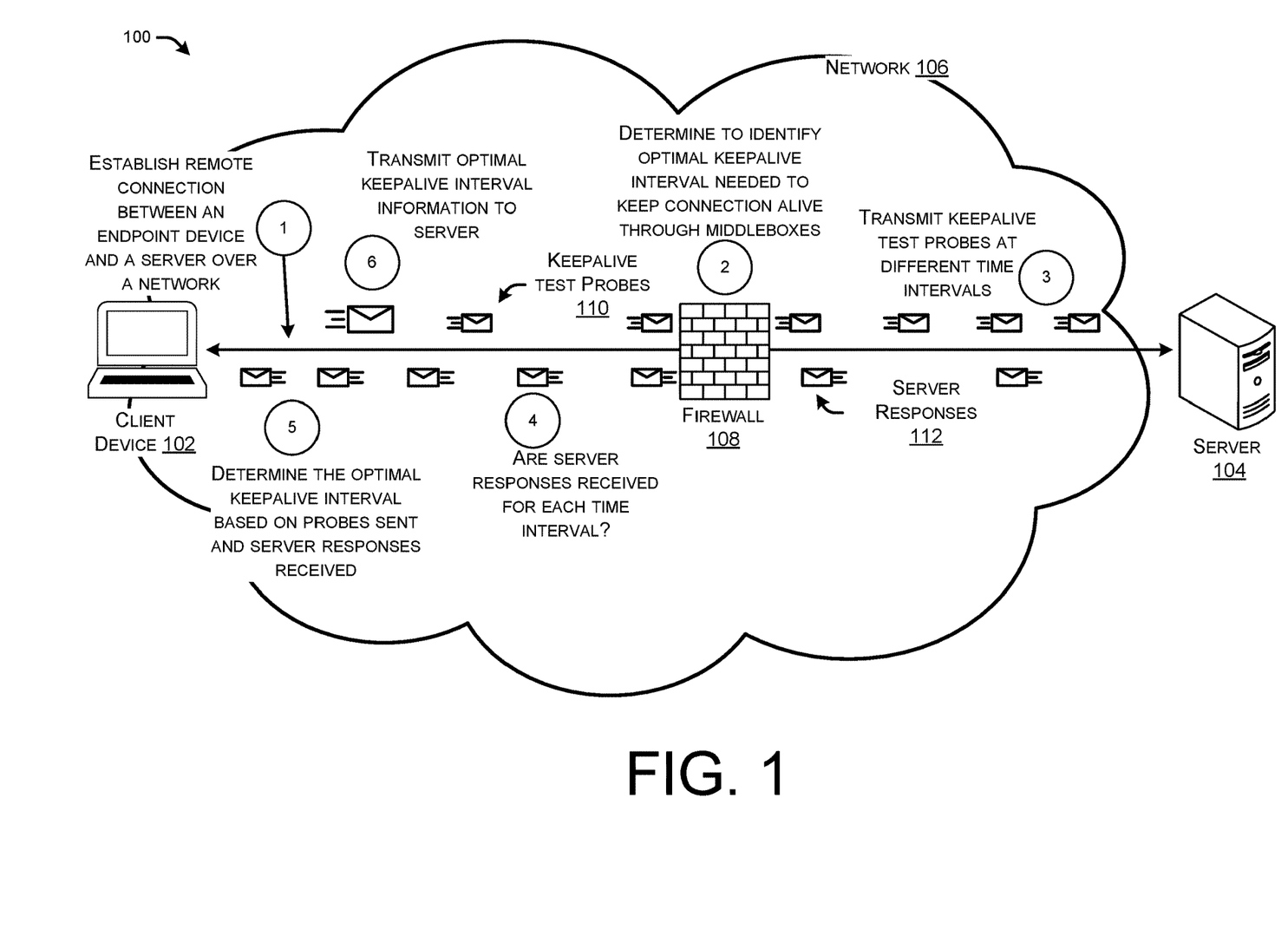
FIG. 1 illustrate a system-architecture diagram of an example environment for implementing an optimal keepalive interval for a network configuration between a client endpoint and a server.

FIG. 1 illustrates an example system architecture diagram of an example environment 100 for determining and implementing an optimal keepalive interval for a remote secure communication session between a client device 102 and a server 104 over a network 106 with a particular network configuration. The network over which the client device 102 and the server 104 communicate, may be configured with various network devices including but not limited to switches, routers, bridges, gateway, access point, and middleboxes including but not limited to firewalls, network address translators (NATs), proxies, and deep packet inspections (DPI) boxes. Environment 100 illustrates firewall 108 to represent middleboxes that may be included in a network, however the techniques described herein are not limited to determining optimal keepalive intervals for networks with a firewall as a middlebox. Firewall 108 is an example middlebox and it should be understood that other middleboxes may be configured in the network 106 instead of or in addition to firewall 108.

In addition, environment 100 includes keepalive test probes 110 that are sent from client device 102 to server 104 through network 106 including through firewall 108. The keepalive test probes are sent at various different time intervals through the network to determine an optimal keepalive interval for keeping a communication session open through firewall 108 in network 106. Responses 112 are sent back to client device 102 from the server 104, for example the responses may be data traffic sent from the server 104 to the client device 102, or alternately or in addition may be a DPD probe sent during periods when no data traffic has been sent or received and no keepalive test probes 110 have been received resulting in the server 104 not knowing if the communication session is still alive. An optimal keepalive interval may be determined based at least in part on the keepalive test probes 110 sent and whether responses 112 are received by the client device 102 from the server 104.

FIG. 1 illustrates the environment 100 in a simplified environment for determining and implementing an optimal keepalive interval for a remote secure communication session between a client device 102 and a server 104 over a network 106 with a particular network configuration. The environment is simplified because it does not show data traffic that may be sent from the client device 102 and to the server 104. It should be understood that an optimal keepalive interval may be determined on a connection that experiences regular and/or periodic data flow between the client device 102 and the server 104. Alternately or in addition, an optimal keepalive interval may also be determined on a remote secure connection between the client device 102 and the server 104 with no data traffic flow from the client device 102 to the server 104 as illustrated in FIG. 1.

At (1) a remote secure connection between the client device 102 and the server 104 is established over network 106. For example, the remote secure session may be an IPsec VPN connection, a DTLS VPN connection, a QUIC connection, or any other appropriate type of remote secure communication session established between the client device 102 and the server 104 over the network 106.

At (2) a determination is made to identify an optimal keepalive internal needed to keep the connection alive through middleboxes in the network 106. For example, firewall 108 may terminate a connection after a predetermined amount of time if no data traffic is observed between the client device 102 and the server 104. Thus, keepalive packets may need to be transmitted from the client device 102 and to the server 104 during periods of data inactivity to ensure the connection remains open through the firewall 108.

At (3) the client device 102 will send keepalive test probes 110 at various different time intervals to the server 104. As described above the varying intervals at which the keepalive test probes are transmitted may be determined using various algorithms depending on the criticality of the connection and requirements of an enterprise organization. In some examples, an algorithm starting with an interval known to keep a connection open and incrementally increasing time intervals may be used until an interval is found in which the connection is terminated may be used. In other examples, an algorithm starting with an interval known to terminate a connection, then incrementally decreasing time intervals may be used until an interval is found that will keep a connection open through firewall 108.

At (4) the client device 102 waits for responses 112 from the server 104 during the time intervals between each keepalive test probe 110 that was sent. When the client device 102 receives server responses 112 for a time interval between keepalive test probes 110, the client device 102 knows that the interval between that most recent keepalive test probe and the packet just prior is a keepalive interval that will keep a connection alive through the middleboxes in that network configuration. When the client device 102 does not receive server responses 112 for between keepalive test probes 110, the client device 102 knows that the interval between the most recent keepalive test probe and the packet just prior is an interval that will not keep the connection alive through middleboxes in that network configuration. The client device 102 may verify that a connection has been terminated by sending a DPD probe to the server 104 and verifying that no DPD response is received from the server 104.

At (5) an optimal keepalive interval is determined based on keepalive test probes 110 sent and server responses 112 received by the client device 102. Depending on the keepalive test probes 110 that are sent from the client device 102 at various intervals to the server 104, and which intervals elicit server responses 112 the client device 102 receives back from the server 104, an optimal keepalive interval may be determined. Using algorithms described herein, an optimal keepalive interval may be determined that approaches the longest interval possible between packets that will keep the communication session active through middleboxes in a network yet still ensure the session will not be unexpectedly terminated.

At (6) once the optimal keepalive interval is determined for the particular configuration of network 106, the client device 102 will transmit the keepalive interval information to the server 104, and may transmit keepalive packets according to the optimal keepalive interval when there is a lack of data traffic. Additionally, the optimal keepalive interval for the server 104 over the network 106 may be cached by the client device 102 such that when connecting to the server 104 over the network 106 in subsequent sessions, the optimal keepalive interval may be used without needing to determine an optimal keepalive interval for that network configuration again.

Figure 2:
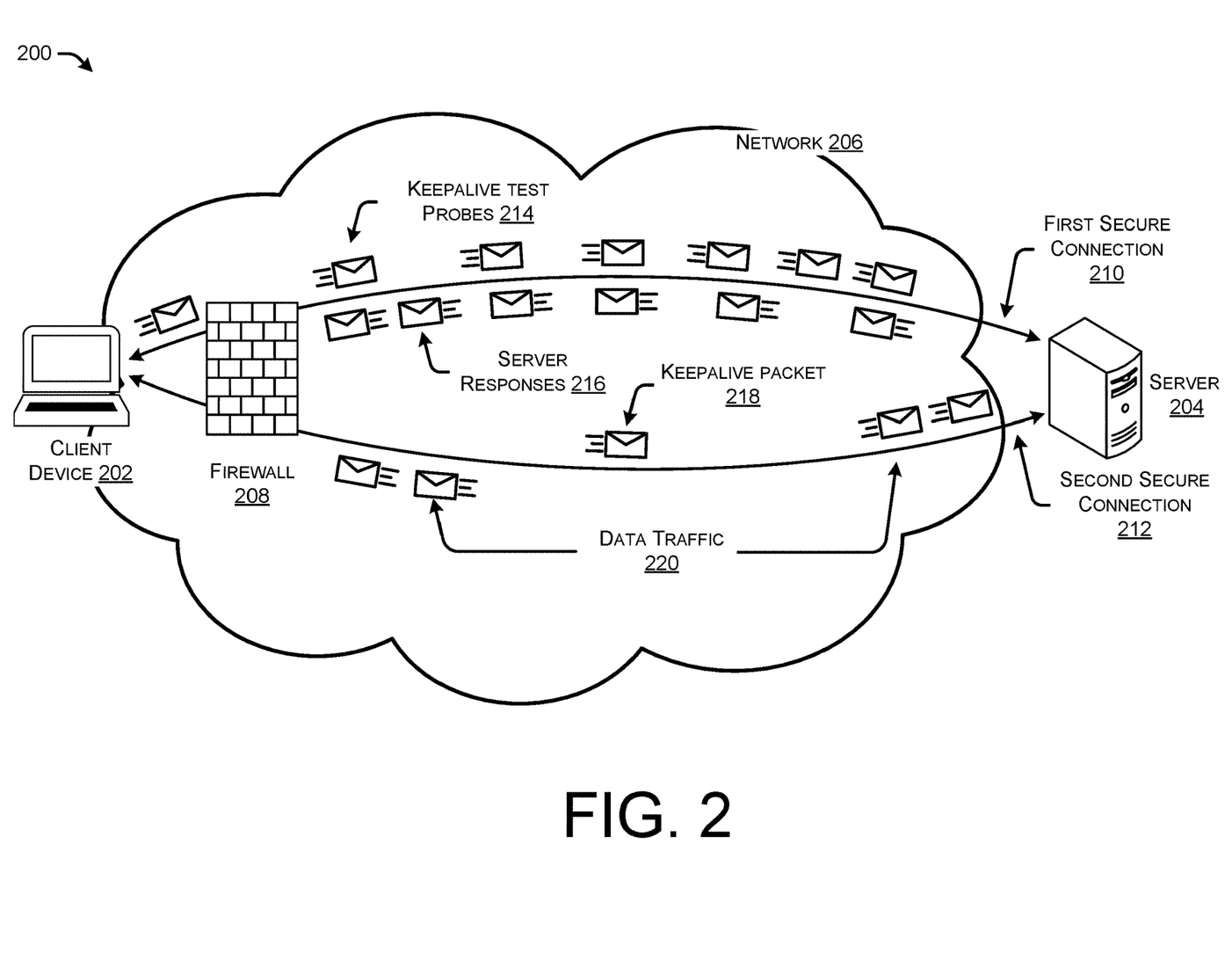
FIG. 2 illustrate a system-architecture diagram of an example environment for determining an optimal keepalive interval using parallel connections between a client endpoint and a server through a network.

FIG. 2 illustrates an example system architecture diagram of an example environment 200 for determining an optimal keepalive interval using parallel remote secure connections between a client device 202 and a server 204 through a network 206 with a particular configuration. For example, the network configuration for network 206 includes firewall 208 as an example middlebox, although network 206 could include a different middlebox, or additional middleboxes. Environment 200 also include two remote secure connections between the client device 202 and the server 204, a first secure connection 210 and a second secure connection 212. For example, the connections may be an IPsec VPN connection, a DTLS VPN connection, a QUIC connection, or any other appropriate type of remote secure communication session established between the client device 202 and the server 204 over network 206.

When a connection between a client device 202 and a server 204 is deemed critical (e.g., in a hospital) and the termination of the connection could be catastrophic, a first secure connection 210 may be used to determine an optimal keepalive interval as described with reference to FIG. 1 using keepalive test probes 214 and server responses 216, while a second secure connection 212 is used to send and receive the critical data and a keepalive interval is used that is known to keep the connection alive, such as by sending a keepalive packet 218 at a default 30 seconds interval during periods of data flow inactivity. The second secure connection 212, also shows the critical data traffic 220 exchanged between the client device 202 and the server 204. In environment 200, the first secure connection 210 over which an optimal keepalive time interval is determined, may inadvertently be terminated in the process depending on which algorithm is used to determine the optimal keepalive interval. However, this will not affect the critical data traffic 220 between client device 202 and the server 204, as the second secure connection 212 will stay alive and allow for all critical data transfer even as secure connection 210 may be terminated in the process of determining the optimal keepalive interval.

Similar to the process for determining an optimal keepalive interval as described with reference to FIG. 1, the client device 202 will send keepalive test probes 214 at various different time intervals to server 204. The client device 202 will then wait and see whether server responses 216 are received during each interval between keepalive test probes 214 that are sent from the client device 202 to the server 204. When the client device 202 receives server responses 216 for an interval between keepalive test probes 214, the client device 202 knows that the interval between the most recent keepalive test probe and the packet just prior is a keepalive interval that will keep a connection alive through the middleboxes in that network configuration. When the client device 202 does not receive any server responses 216 for an interval between keepalive test probes 214 that are sent, the client device 202 knows that the interval between the most recent keepalive test probe and the packet just prior is an interval that will not keep the connection alive through middleboxes in that network configuration. The client device 202 may verify that a connection has been terminated by sending a DPD probe to the server 204 and verifying that no DPD response is received from the server 204. Using this information, the client device 202 may determine the optimal keepalive interval for network 206.

Once an optimal keepalive interval is determined on the first secure connection 210 between the client device 202 and the server 204 over network 206, the client device 202 may send the optimal keepalive interval information to server 204 such that the second secure connection 212 may use the optimal keepalive interval instead of the default keepalive interval. Once the optimal keepalive interval is determined and the client device 202 has transitioned to using the optimal keepalive interval instead of the default keepalive interval on the second secure connection 212, the first secure connection 210 may be terminated and the optimal keepalive interval will be implemented on the second secure connection 212.

Figure 3:
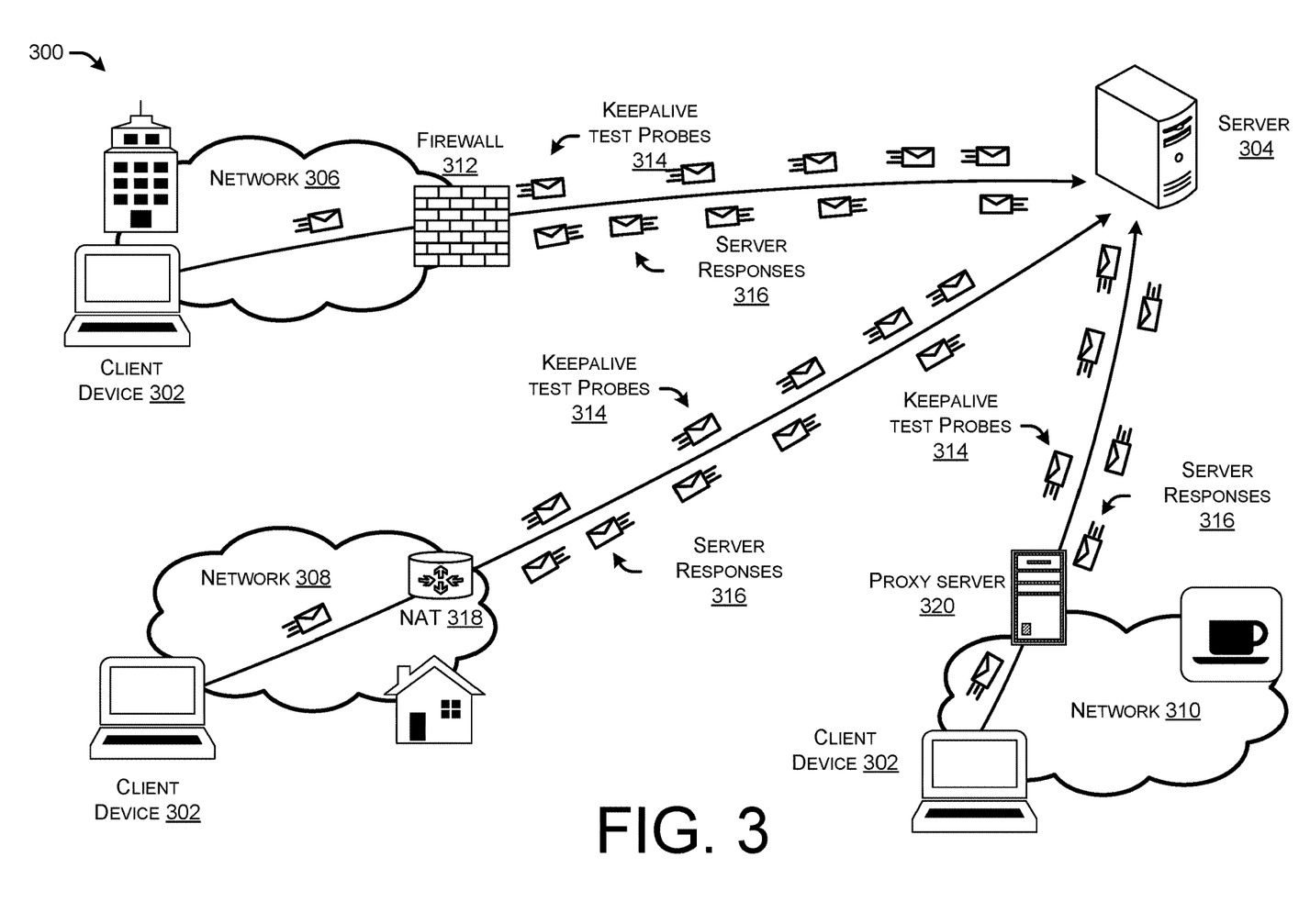
FIG. 3 illustrate a system-architecture diagram of an example environment for determining and implementing optimal keepalive intervals between a client endpoint and a server over different network configurations.

FIG. 3 illustrates an example system architecture diagram of example environment 300 for determined and implementing optimal keepalive intervals between a client device and a server over different network configurations. Environment 300 includes client device 302 and server 304. Client device 302 may establish a remote secure connection with server 304 over various networks. For example, client device 302 may regularly connect to server 304 over a network 306 which may be a network at a workplace of a user associated with client device 302. In another example, client device 302 may establish a remote secure connection to server 304 over a home network 308 of a user associated with client device 302. In still another example, client device 302 may establish a remote secure connection with server 304 over a network 310 at a local coffee shop in which the user associated with client device 302 frequents.

FIG. 3 illustrates the environment 300 in a simplified environment for determining and implementing an optimal keepalive interval for a remote secure communication session between a client device 302 and a server 304 over a networks 306-310 with a distinct network configurations. The environment is simplified because it does not show data traffic that may be sent from the client device 302 and to the server 304. It should be understood that an optimal keepalive interval may be determined on a connection that experiences regular and/or periodic data flow between the client device 302 and the server 304. Alternately or in addition, an optimal keepalive interval may also be determined on a remote secure connection between the client device 302 and the server 304 with no data traffic flow from the client device 302 to the server 304 as illustrated in FIG. 3.

Each individual network 306-310 that client device 302 may join to connect to server 304, will have its own individual configuration thus, each network will have a distinct optimal keepalive interval to keep a connection between client device 302 and server 304 alive though middleboxes in that network. For example, when client device 302 joins network 306 and establishes a remote secure connection to server 304, an optimal keepalive interval for network 306 may be determined that keeps the connection alive through firewall 312 (and any other middleboxes that may be in the network 306 configuration). Similar to the process described above with reference to FIG. 1, client device 302 will send keepalive test probes 314 at various different time intervals and wait to see whether responses 316 are received from the server 304 between the keepalive test probes 314 transmitted. The optimal keepalive interval for network 306 may be determined based on the keepalive test probes 314 transmitted and the server responses 316 received.

Similarly, when client device 302 joins network 308 and establishes a remote secure connection to server 304, an optimal keepalive interval for network 308 may be determined that keeps the connection alive through the NAT router 318 (and any other middleboxes that may be in the network 308 configuration). Client device 302 will send keepalive test probes 314 at various time intervals and wait to see whether responses 316 are received from the server 304 between the keepalive test probes 314 transmitted. The optimal keepalive interval for network 308 may be determined based on the keepalive test probes 314 transmitted and the server responses 316 received.

When client device 302 joins network 310 and establishes a remote secure connection to server 304, an optimal keepalive interval for network 310 may be determined that keeps the connection alive through proxy server 320 (and any other middleboxes that network 310 may contain). Similar to the process described with reference to FIG. 1, client device 302 will send keepalive test probes 314 at various time intervals and wait to see whether server responses 316 are received from the server 304 between the keepalive test probe 314 transmitted. The optimal keepalive interval for network 310 may be determined based on the keepalive test probes 314 transmitted and the server responses 316 received.

Once client device 302 has determined the optimal keepalive time for the three different networks 306-310 as shown, client device 302 may cache the optimal keepalive interval for the server 304 over each particular network such that when connecting to the server 304 over each particular network in subsequent remote secure sessions, the optimal keepalive interval for that particular network may be used. The optimal keepalive interval for a particular network may be redetermined if a network interface change is detected (new SSID, new IP assignment, etc.), a network configuration change has occurred, or in some examples, an enterprise organization may determine that after a predetermined amount of time has elapsed that the optimal keepalive interval is to be redetermined. An enterprise organization may institute a policy to redetermine an optimal keepalive interval as some optimization changes in middleboxes present in a network will not be detected, resulting in the current optimal keepalive interval not being optimal (e.g., keepalive packet sent more often than necessary or keepalive packets not sent often enough resulting in connection termination or reset)

Figure 4:
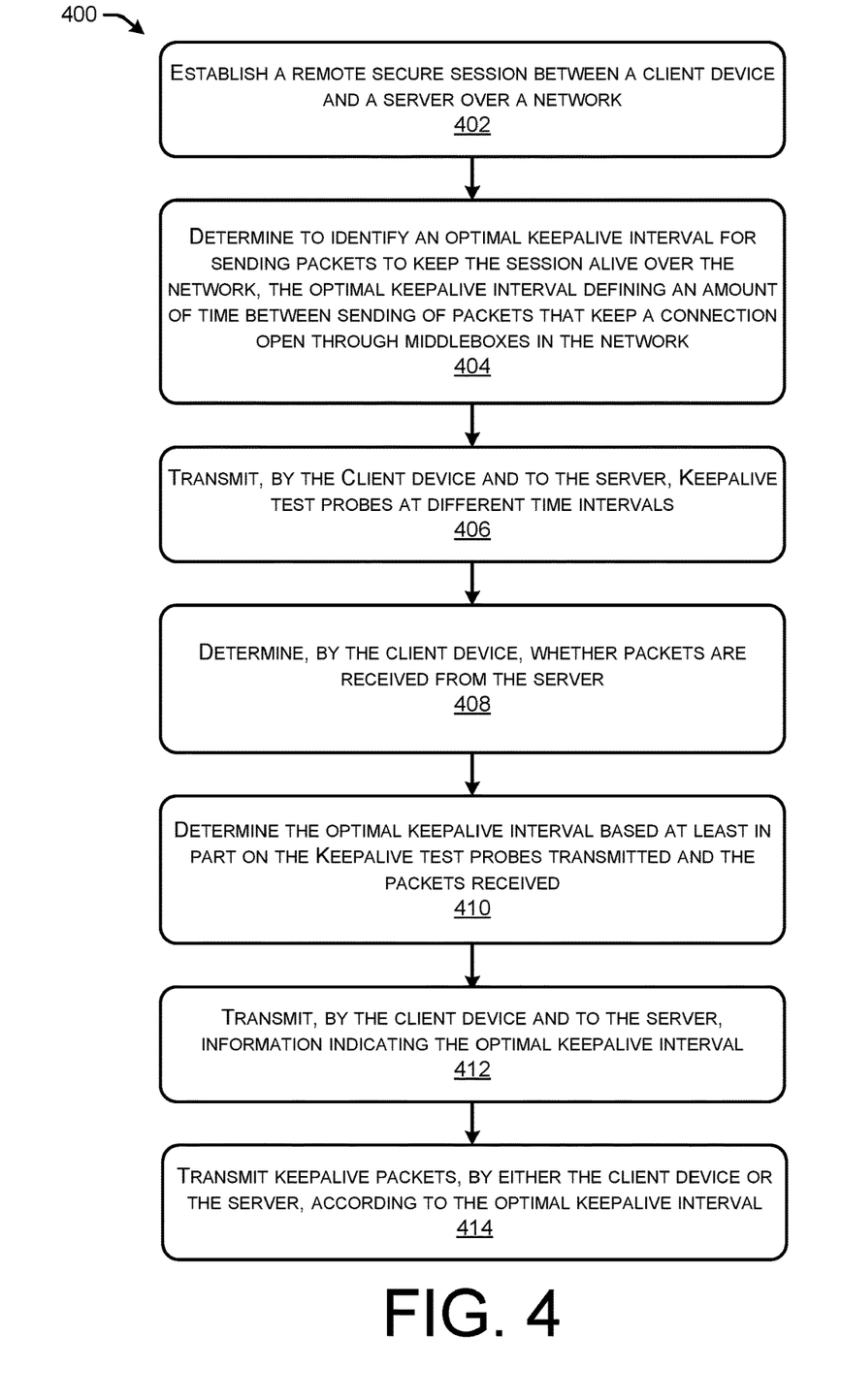
FIG. 4 illustrates a flow diagram of an example method for determining an optimal keepalive interval for a network configuration.

FIG. 4 illustrates a flow diagram of example process 400 that describes aspects of determining an optimal keepalive interval as described in FIGS. 1-3. The logical operations described herein with respect to FIG. 4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 4 and as described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

At operation 402, a remote secure session between a client device and a server is established over a network. For example, with reference to FIG. 1, client device 102 establishes a remote secure session with server 104. The remote secure session may be an IPsec VPN connection, a DTLS VPN connection, a QUIC connection, or any other type of appropriate remote secure connection between client device 102 and server 104. In another example with reference to FIG. 3, the client device 302 may establish a remote secure session with server 304. In some examples, two parallel remote secure sessions may be established in order to facilitate the determination of an optimal keepalive interval. For example, with reference to FIG. 2, a first secure connection 210 is established in order to determine the optimal keepalive interval and a parallel second secure connection 212 is establish that uses a default keepalive interval to ensure that a critical connection between client device 202 and server 204 will not be terminated or reset.

At operation 404, a determination to identify an optimal keepalive interval for sending packets to keep the session alive over the network is made. The optimal keepalive interval defines an amount of time between sending of packets that keep a connection open through middleboxes in the network. For example, with reference to FIG. 1, at (2) a determination is made to identify the optimal keepalive interval needed to keep the remote secure connection between client device 102 and server 104 open through firewall 108 (and any other middleboxes that may be in network 106). With reference to FIG. 3, a determination may be made to identify an optimal keepalive interval to keep the connection open through middleboxes in a network between client device 302 and server 304 over each of the three networks shown, network 306, network 308, and network 310. Specifically, for network 306, a determination is made to identify an optimal keepalive interval to keep a remote secure connection alive between client device 302 and server 304 through the firewall 312. Similarly, when client device 302 joins their home network 308, a determination may be made to identify an optimal keepalive interval to keep a connection alive though the NAT router 318. Finally, when client device 302 joins network 310 at a local coffee shop, a determination may be made to identify an optimal keepalive interval to keep a connection alive through the proxy server 320. A determination to identify an optimal keepalive interval needed to keep a connection alive through middleboxes in a network is made when a client device connects to a network for the first time, when a network interface change (new SSID, new IP assignment, etc.) is detected, or, in some examples, when a predetermined amount of time has expired as may be defined by an enterprise organization. When a client device joins a familiar network, and no network interface change is detected, the client device need not redetermine an optimal keepalive interval, but instead use an optimal keepalive interval that is cached by the client device from a previous session.

Some network changes may not be detected directly by a client device (e.g., state of all intermediary devices). However, the change may be detected indirectly if a previously determined optimal keepalive interval stops working. For example, if a connection between a client device and a server is terminated or reset using the most recently determined optimal keepalive interval. Thus, when this happens, the client device will need to redetermined the optimal keepalive interval. In some examples, to reduce the accidental termination or reset of a connection, a client device will periodically redetermine an optimal keepalive interval, even when a network is familiar. In another example, a client device may check how long it has been since the client device joined a particular network, and if it has been longer than a predetermined length of time, the client device may redetermined the optimal keepalive interval when the client device joins that network.

At operation 406, a client device transmits keepalive test probes at different time intervals to the server. For example, referring to FIG. 1, client device 102 sends keepalive test probes 110 to server 104 at various different time intervals. With reference to FIG. 3, client device 302 sends keepalive test probes 314 to server 304 at different time intervals over each network when the client device 302 joins that network (e.g., network 306, network 308, and network 310).

At operation 408, the client device determines whether packets are received from the server. For example, with reference to FIG. 1, For each keepalive test probe 110 that client device 102 sends to server 104, client device 102 determines whether it receives responses 112 back from server 104, for example data packets of DPD probes. If client device 102 does receive server responses 112, the time interval between the most recent keepalive test probe and the packet just prior will keep the connection alive through the firewall 108. If the client device 102 does not receive any responses from the server, the time interval between the most recent keepalive test probe and the packet just prior will not keep the connection open through the firewall 108.

At operation 410, the optimal keepalive interval is determined based at least in part on the keepalive test probes transmitted and the packets received. An optimal keepalive interval will be an interval that approaches the longest interval possible between packets that will keep the communication session active through middleboxes in a network yet still ensure the session will not be terminated or reset. The optimal keepalive interval may be determined based on the various intervals between the keepalive test probes that are sent from the client device and whether responses are received during each interval.

At operation 412, the client device transmits information indicating the optimal keepalive interval to the server. For example, with reference to FIG. 1, once an optimal keepalive interval is determined, at (6) the optimal keepalive interval information is transmitted to the server 104 by the client device 102. In addition, the client device will cache the optimal keepalive interval for the server over the network such that when connecting to the server 104 over the network 106 in subsequent remote secure sessions, the optimal keepalive interval may be used. In another example, with reference to FIG. 3, the client device 302 is shown establishing a remote secure session to server 304 over three different networks, network 306, network 308, and network 310. Each network will have a different configuration thus, each network will have a different optimal keepalive interval. When client device 302 joins one of the networks to connect to server 304 the client device 302 may use the optimal keepalive interval that is cached for that particular network.

At operation 414, keepalive packets are transmitted by the client device according to the optimal keepalive interval. Once an optimal keepalive interval has been determined for a connection between a client device and a server over a network, the client device may send keepalive packets to keep the connection between them alive through middleboxes in the network during times of no data flow over the connection.

Figure 5:
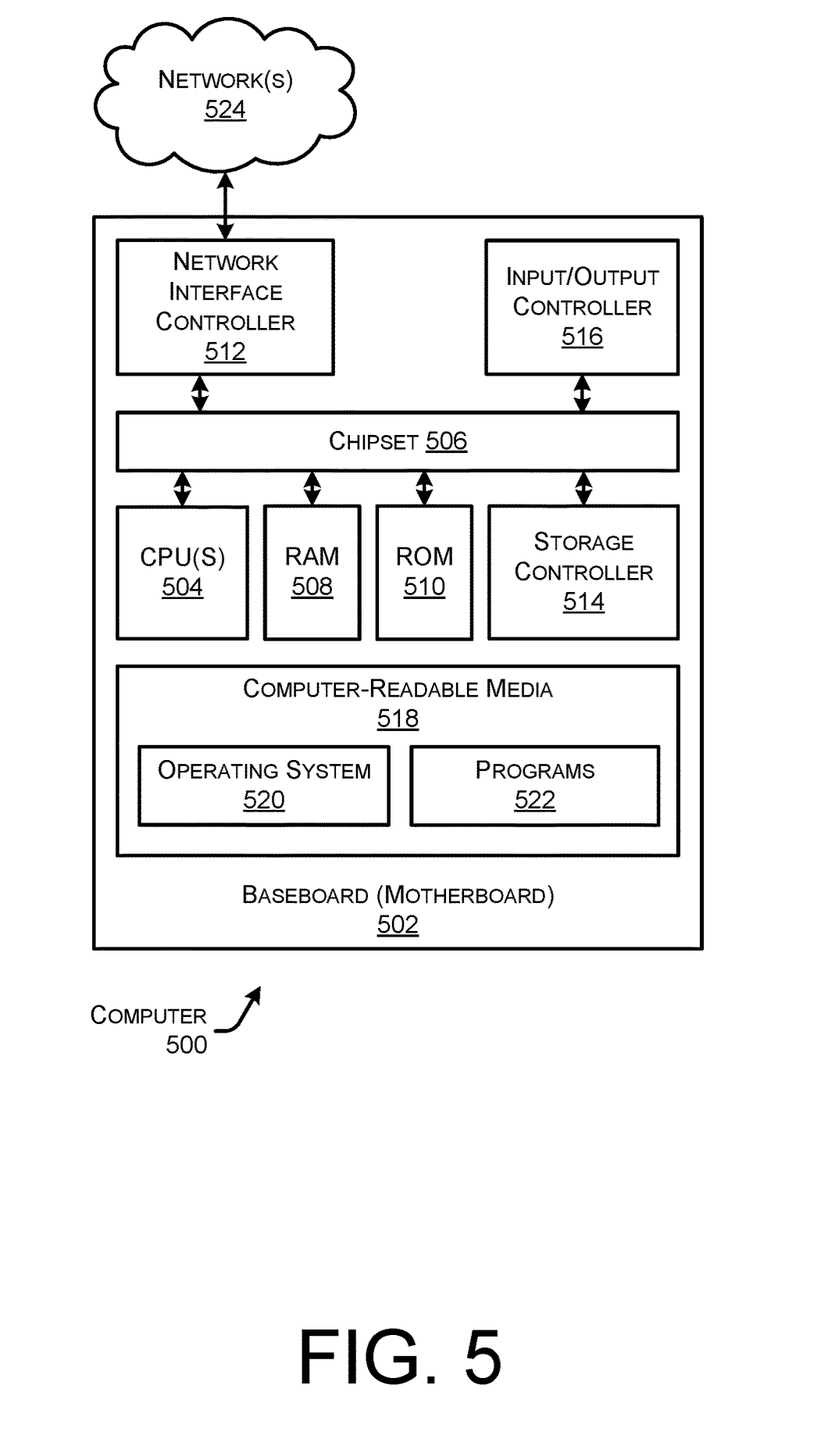
FIG. 5 illustrates a computer architecture diagram showing an example computer hardware architecture for implementing a network device that can be utilized to implement aspects of the various technologies presented herein.

FIG. 5 shows an example computer architecture for a computer 500 capable of executing program components for implementing the functionality described herein. The computer architecture shown in FIG. 5 illustrates a conventional server computer, workstation, desktop computer, laptop, tablet, network appliance, e-reader, smartphone, or other computing device, and can be utilized to execute any of the software components presented herein. The computer 500 may, in some examples, correspond to any of the servers, routers, or devices discussed herein. In some embodiments, computer 500 may include networked devices such as servers, switches, routers, hubs, bridges, gateways, modems, repeaters, access points, firewalls etc. Additionally, in some implementations, the programs or software discussed herein may be configured to perform operations performed by any of the devices. In some instances, the computer may correspond to any device described herein and be configured to perform operations performed by any device, and/or may be a system of devices that perform the techniques described herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network 524, such as the network 106 of FIG. 1 or networks 306, 308, and 310 of FIG. 3. The chipset 506 can include functionality for providing network connectivity through a Network Interface Controller (NIC) 512, such as a gigabit Ethernet adapter. The NIC 512 is capable of connecting the computer 500 to other computing devices over the networks described herein. It should be appreciated that multiple NICs 512 can be present in the computer 500, connecting the computer to other types of networks and remote computer systems.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by devices described herein, and or any components included therein, may be supported by one or more devices similar to computer 500. Stated otherwise, some or all of the operations performed by the client device 102, the server 104, and or any components included therein, may be performed by one or more computer devices 500 operating in a system.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described herein. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

As described herein, the computer 500 may comprise one or more of a router, a border router, a switch, and/or a server. The computer 500 may include one or more hardware processors 504 (processors) configured to execute one or more stored instructions. The processor(s) 504 may comprise one or more cores. Further, the computer 500 may include one or more network interfaces configured to provide communications between the computer 500 and other devices, such as the communications described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, Bluetooth, Zigbee IEEE 802 family of protocols, and so forth.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   establishing a first remote secure session between a client device and a server over a network;
   establishing a second remote secure session between the client device and the server over the network;
   determining to identify an optimal keepalive interval for sending packets to keep the first remote secure session alive over the network, the optimal keepalive interval defining an amount of time between sending of packets that keep a connection open through middleboxes in the network;
   transmitting, by the client device and to the server, keepalive packets over the first remote secure session according to a predetermined default interval known to keep a remote secure session from timing out;
   transmitting, by the client device and to the server, keepalive test probes at different time intervals over the second remote secure session;
   determining, by the client device, whether packets are received from the server;
   determining the optimal keepalive interval based at least in part on the keepalive test probes transmitted and the packets received;
   transmitting, by the client device and to the server, information indicating the optimal keepalive interval;
   closing the second remote secure session; and
   transmitting keepalive packets, by the client device and to the server, over the first remote secure session according to the optimal keepalive interval.

2. The method of claim 1, further comprising detecting a change associated with a network interface of the client device and determining to identify a new optimal keepalive interval.

3. The method of claim 1 wherein the first remote secure session comprises one of:
   an Internet Protocol security (IPsec) Virtual Private Network (VPN) connection;
   a Datagram Transport Layer Security (DTLS) VPN connection; or
   a QUIC connection.

4. The method of claim 1, further comprising caching, by the client device, the optimal keepalive interval for the server over the network such that when connecting to the server over the network in subsequent remote secure sessions, the optimal keepalive interval is used.

5. The method of claim 1 further comprising determining to identify a new optimal keepalive interval for the server over the network based on at least one of detecting that a change associated with a network configuration has occurred, a change associated with the server has occurred, or a predetermined time interval has elapsed.

6. The method of claim 1, wherein the different time intervals further comprise at least one of:
   increasing intervals of time until an interval causing the second remote secure session to time out and an interval prior to the interval causing the second remote secure session to time out is determined to be the optimal keepalive interval; or
   decreasing intervals of time, wherein a first interval causes the second remote secure session to time out, until an interval that does not cause the second remote secure session to time out is determined to be the optimal keepalive interval.

7. The method of claim 1, further comprising:
determining that the first remote secure session has roamed to a different interface;
transmitting, by the client device and to the server, keepalive packets according to the predetermined default interval known to keep a remote session form timing out;
establishing a third remote secure session between the client device and the server;
transmitting, by the client device and to the server, keepalive test probes at different time intervals over the third remote secure session;
determining, by the client device, whether packets are received from the server;
determining the optimal keepalive interval based at least in part on the keepalive test probes transmitted and the packets received;
transmitting, by the client device and to the server, information indicating the optimal keepalive interval;
closing the third remote secure session; and
transmitting keepalive packets, by the client device to the server, over the first remote secure session according to the optimal keepalive interval.

8. A system comprising:
one or more processors; and
one or more non-transitory computer-readable media storing computer-executable instructions that, when executed by the one or more processors, cause the one or more processors to perform operations comprising:
establishing a first remote secure session between a client device and a server over a network;
establishing a second remote secure session between the client device and the server over the network;
determining to identify an optimal keepalive interval for sending packets to keep the first remote secure session alive over the network, the optimal keepalive interval defining an amount of time between sending of packets that keep a connection open through middleboxes in the network;
transmitting, by the client device and to the server, keepalive packets over the first remote secure session according to a predetermined default interval known to keep a remote secure session from timing out;
transmitting, by the client device and to the server, keepalive test probes at different time intervals over the second remote secure session;
determining, by the client device, whether packets are received from the server;
determining the optimal keepalive interval based at least in part on the keepalive test probes transmitted and the packets received;
transmitting, by the client device and to the server, information indicating the optimal keepalive interval;
closing the second remote secure session; and
transmitting keepalive packets, by either the client device or the server, over the first remote secure session according to the optimal keepalive interval.

9. The system of claim 8, further comprising detecting a change associated with a network interface of the client device and determining to identify a new optimal keepalive interval.

10. The system of claim 8, wherein the first remote secure session comprises one of:

an Internet Protocol security (IPsec) Virtual Private Network (VPN) connection;
a Datagram Transport Layer Security (DTLS) VPN connection; or
a QUIC connection.

11. The system of claim 8, the operations further comprising caching, by the client device, the optimal keepalive interval for the server over the network such that when connecting to the server over the network in subsequent remote secure sessions, the optimal keepalive interval is used.

12. The system of claim 8, the operations further comprising determining to identify a new optimal keepalive interval for the server over the network based on at least one of detecting that a change associated with a network configuration has occurred, a change associated with the server has occurred, or a predetermined time interval has elapsed.

13. The system of claim 8, wherein the different time intervals further comprise at least one of:
increasing intervals of time until an interval causing the remote secure session to time out and an interval prior to the interval causing the second remote secure session to time out is determined to be the optimal keepalive interval; or
decreasing intervals of time, wherein a first interval causes the second remote secure session to time out, until an interval that does not cause the second remote secure session to time out is determined to be the optimal keepalive interval.

14. One or more non-transitory computer-readable media storing instructions that, when executed, cause one or more processors to perform operations comprising:
establishing a first remote secure session between a client device and a server over a network;
establishing a second remote secure session between the client device and the server over the network;
determining to identify an optimal keepalive interval for sending packets to keep the first remote secure session alive over the network, the optimal keepalive interval defining an amount of time between sending of packets that keep a connection open through middleboxes in the network;
transmitting, by the client device and to the server, keepalive packets over the first remote secure session according to a predetermined default interval known to keep a remote secure session from timing out;
transmitting, by the client device and to the server, keepalive test probes at different time intervals over the second remote secure session;
determining, by the client device, whether packets are received from the server;
determining the optimal keepalive interval based at least in part on the keepalive test probes transmitted and the packets received;
transmitting, by the client device and to the server, information indicating the optimal keepalive interval;
closing the second remote secure session; and
transmitting keepalive packets, by either the client device or the server, over the first remote secure session according to the optimal keepalive interval.

15. The one or more non-transitory computer-readable media of claim 14, the operations further comprising detecting a change associated with a network interface of the client device and determining to identify a new optimal keepalive interval.

16. The one or more non-transitory computer-readable media of claim 14, wherein the first remote secure session comprises one of:
- an Internet Protocol security (IPsec) Virtual Private Network (VPN) connection;
- a Datagram Transport Layer Security (DTLS) VPN connection; or
- a QUIC connection.

17. The one or more non-transitory computer-readable media of claim 14, the operations further comprising caching, by the client device, the optimal keepalive interval for the server over the network such that when connecting to the server over the network in subsequent remote secure sessions, the optimal keepalive interval is used.

18. The one or more non-transitory computer-readable media of claim 14, wherein the different time intervals further comprise at least one of:
- increasing intervals of time until an interval causing the remote secure session to time out and an interval prior to the interval causing the second remote secure session to time out is determined to be the optimal keepalive interval; or
- decreasing intervals of time, wherein a first interval causes the second remote secure session to time out, until an interval that does not cause the second remote secure session to time out is determined to be the optimal keepalive interval.

19. The one or more non-transitory computer-readable media of claim 14, the operations further comprising determining to identify a new optimal keepalive interval for the server over the network based on at least one of detecting that a change associated with a network configuration has occurred, a change associated with the server has occurred or a predetermined time interval has elapsed.

20. The one or more non-transitory computer-readable media of claim 14, the operations further comprising:
- determining that the first remote secure session has roamed to a different interface;
- transmitting, by the client device and to the server, keepalive packets according to the predetermined default interval known to keep a remote session form timing out;
- establishing a third remote secure session between the client device and the server;
- transmitting, by the client device and to the server, keepalive test probes at different time intervals over the third remote secure session;
- determining, by the client device, whether packets are received from the server;
- determining the optimal keepalive interval based at least in part on the keepalive test probes transmitted and the packets received;
- transmitting, by the client device and to the server, information indicating the optimal keepalive interval;
- closing the third remote secure session; and
- transmitting keepalive packets, by the client device to the server, over the first remote secure session according to the optimal keepalive interval.

\* \* \* \* \*